United States Patent Office 3,618,494
Patented Nov. 9, 1971

3,618,494
METHOD AND APPARATUS FOR PHOTOGRAPHING RAPIDLY MOVING BODIES
Peter Bettermann, Monchen-Gladbach, and Henning Dechow, Wittlaer, near Dusseldorf-Kaiserswerth, Germany, assignors to Rheinmetall GmbH, Dusseldorf, Germany
Filed July 17, 1968, Ser. No. 745,616
Claims priority, application Germany, July 28, 1967, R 46,601
Int. Cl. G03b 35/08
U.S. Cl. 95—18                                     5 Claims

ABSTRACT OF THE DISCLOSURE

A method and an apparatus for photographing rapidly moving bodies, especially projectiles or the like, in which the rapidly moving body is imaged on a moving film strip by means of several picture-taking optical systems which are arranged along the trajectory of the body, the film velocity being so chosen that the ratio of the velocity of the body to the velocity of the film substantially corresponds to the optical image ratio of the optical systems to avoid relative movement between image and film, and the optical systems being so arranged and directed that the intervals between the points of the trajectory of the body sighted by the individual optical systems and the velocity of the projectile determine the desired picture frequency.

---

This invention relates to a method and apparatus for photographing rapidly moving bodies, and especially projectiles such as flying shells, rockets or the like, in which the rapidly moving body is imaged by means of a picture-taking optical system on a moving film strip, the film velocity being so chosen that the ratio of the velocity of the moving body to the velocity of the film corresponds substantially to the optical image ratio of the optical system so as to avoid relative movement between the image and the film.

It is known in the supervision of moving cables and of moving railway trains to photograph the moving objects on a film moving in the opposite direction proportionally to the optical image projected thereon so as to avoid relative movement between the image and the film. This principle has also been employed in aerial photography, for compensating for the relative velocity between the terrain to be photographed and the aircraft.

Methods of photographing shells are also already known in which the frequency of image projection, or recurrence, is determined by the film velocity or the time interval of illumination flashes. In the first-mentioned method with moving film, the film velocity is proportional to the image recurrence frequency or number of pictures per second, the image size being a proportionality factor. Exposure times of the film to the images may be further shortened by additional shutters or the like. Spark slow-motion cameras, for example those in accordance with the Cranz-Schardin method, can only be used in photographing objects in passages which can be blacked out, due to their optical construction, and therefore are suitable only for objects of small size.

Wtih the above discussion in mind, it is an object of this invention to provide a method of photographing moving bodies such as projectiles in which the choice of the picture frequency or image recurrence frequency is not subjected to the aforementioned limitations. In the method according to this invention, this problem is solved through the use of a plurality of picture-taking optical systems which are arranged along the trajectory of the body and so directed that the intervals between the points of the trajectory of the body from which images of the body are projected by the individual optical systems correspond to the desired picture frequency. The method according to this invention affords the advantage that the picture frequency, i.e. the number of pictures per second, may be increased as desired. Within the scope of the method according to this invention it is also possible to make the distances between the points of the trajectory of the body sighted by the optical systems converge to zero. By proceeding in this manner, stereoscopic images of the moving body are obtained.

In the method according to this invention the images of all the picture-taking optical systems may be formed on a single moving film strip, the images produced by the individual optical systems preferably being staggered transversely of the film. Such a staggering of the pictures transversely of the film also affords the possibility of using these pictures for slow-motion reproduction in that they are again copied on a film strip or in that the original film strip passes in the direction of the pictures staggered transversely thereof through a film projector. In further development of this principle, it may be advantageous to arrange a large number of picture-taking optical systems, i.e. objectives, at equal distances apart along the trajectory of the body and accordingly to use a film strip of great width. The film strip may also be made in the form of an endless loop.

The stagegring of the images of the individual optical systems over the film width is normally obtained by arranging the optical systems at different levels, i.e. by a non-parallel arrangement of the optical systems with respect to the trajectory. A parallel arrangement of the optical systems with respect to the trajectory can be achieved if the images of the optical systems are staggered transversely of the film strip for example by two 90° deflection mirrors or deflection prisms, possibly with interposition of intermediate lenses.

It is a further object of this invention to provide an apparatus for carrying out the method according to this invention. The apparatus according to the invention is characterized in that it comprises a plurality of picture-taking optical systems arranged in spaced apart locations along the trajectory of the body. These optical systems are conveniently arranged at equal distances apart along the trajectory of the body and are preferably displaceable and/or pivotal with respect to each other. Preferably, a common drive is provided for pivoting the optical systems, which drive is constructed so that all the optical systems are pivotal mirror-symmetrically to the center axis of the apparatus. In particular, the present invention contemplates that the optical systems are pivoted by means of a common control shaft via worms and worm wheels, the pitches of the individual worms being so chosen that the optical axes of the optical systems are pivoted in the preferred manner. In a preferred embodiment of the apparatus according to the invention, an optical system, an image slit and a film support form an assembly and are pivotal together.

It is additionally contemplated that the image slits disposed in front of the film may be made interchangeable. This feature of the present invention affords an advantage in that the exposure time is given by the quotient of slit width of film speed and a shutter is not in itself necessary in order to vary exposure times. It is recognized, however, that when using a film loop it is advantageous to provide a joint shutter for the individual shutters for all optical systems and to couple it to the firing of the shell.

Further, it is envisioned that the image slits may be displaced perpendicularly to the optical axis of the optical systems in the direction of movement of the film instead of pivoting the optical systems. In this case, the points of the trajectory of the moving body from which images are projected by the optical systems also are displaced along the trajectory so as to vary the image recurrence frequency or the number of images per second.

Some of the objects and advantages of this invention having been stated, others will appear as the description proceeds when taken in connection with the accompanying drawings, in which—

Figure 1:
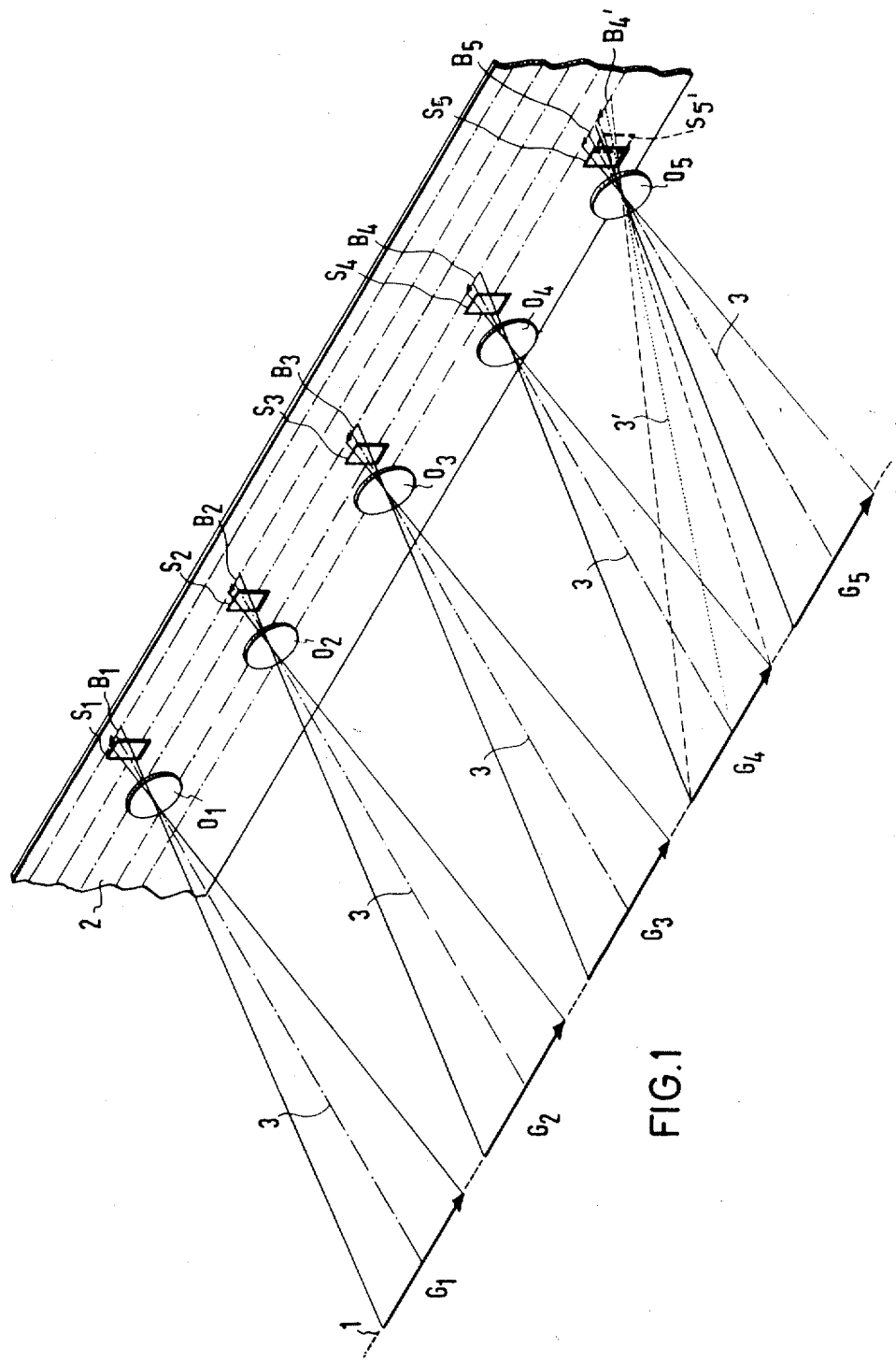
FIG. 1 is a diagrammatic representation of the optical conditions in the photographing method according to the invention.

In the diagrammatic illustration of FIG. 1, the projectile trajectory 1 is represented by a broken line and the projectile by arrows. The shell flies in the arrow direction and passes successively through the positions $G_1$ to $G_5$. Parallel to the shell path is the plane of movement of a film strip 2, which moves in the direction opposite to the shell movement. Arranged along the shell trajectory 1 and interposed between that trajectory and the film 2 are five picture-taking optical systems $O_1$ to $O_5$, with five slits $S_1$ to $S_5$ which are equally spaced apart but at different levels of the film strip, which optical systems have their focal planes at the plane of movement of the film 2. The film strip 2 is accordingly divided vertically into five image tracks and a picture-taking optical system $O_1$ to $O_5$ and a slit $S_1$ to $S_5$ are associated with each of the image tracks. Each of the picture-taking optical systems $O_1$ to $O_5$ thus projects an image $B_1$ to $B_5$ onto a corresponding image track of the film strips 2 upon passage of the projectile past the corresponding point along the trajectory. Denoting the object distance by $g$ and the image distance by $b$, the image ratio of each optical system is $b/g$. Assuming the projectile to move with a velocity $V_G$, the image of the shell projected onto the film strip 2 moves in the opposite direction with a velocity reduced by the factor of the optical image ratio, i.e.

$$V_B = V_G \times \frac{b}{g}$$

If for example $V_G = 1500$ m./sec. and the image ratio $b/g = 1/30$, the velocity with which the image of the shell moves is $V_B = 50$ m./sec.

To produce a stationary image of the shell on the film strip 2 upon exposure of the film, the film velocity $V_F$ must fulfill the condition $V_F = V_B$.

Each of the image tracks is exposed through only one of the slits $S_1$ to $S_5$. The exposure time is therefore fixed by the slit width and the film velocity. For a film velocity of 30 to 50 m./sec. and a slit width of $\frac{1}{10}$ mm. the exposure time is 2 to 3 microseconds.

The number if images produced by a moving body is determined by the number of picture-taking optical systems present. In the illustrated embodiment, five shell images are produced and are staggered on the film strip. In FIG. 1 the ray paths are shown in full line and the optical axes 3 in dot-dash line. The optical axes of the systems $O_1$ to $O_5$ are there shown to be parallel.

The image recurrence frequency, i.e. the number of images per second, can be increased by reducing the distances between the picture-taking optical systems. It is usually, however, not possible to reduce the distances between the optical axes of the optical systems to any desired extent due to the physical dimensions of the systems. As a result, only a relatively slight increase in the image resolution number can be achieved by reducing the spaces between the systems.

A substantial increase in the image recurrence frequency is obtained in accordance with the present invention by the provision of pivotal picture-taking optical systems. If the picture-taking optical systems are pivoted with respect to each other in such a manner that their optical axes converge, the image recurrence frequency may be increased to practically any desired extent. The time intervals of the individual images with respect to each other are thus dependent upon the shell velocity and the degree of pivoting of the optical system. The image recurrence frequency is, however, independent of the film velocity. If for example the five objectives are pivoted so that they photograph a shell at five points equally spaced over a projectile travel distance of 0.004 m., the flight distance of the shell from picture to picture is 0.001 m. For a shell velocity of 1500 m./sec. the time between two images is $t = 0.001/1500 = 66.5 \times 10^{-8}$ seconds. In conventional slow-motion cameras the picture number per second is usually denoted by $f$. In this case, $f = 1/\Delta t$, where $\Delta t$ equals the time intervals between the individual pictures.

By pivoting the picture-taking optical systems to a sufficient extent, it is possible to direct all five objectives to the same point of the trajectory and thus to make the intervals between pictures tend to zero and the picture frequency tend to infinity. This results in pictures of a different perspective of the same phase of the shell flight. If the nominal optical center to optical center distance between the system $O_1$ and the system $O_5$ at the plane of the film 2 is 450 mm., a good stereoscopic effect is achieved when a shell is photographed from a range of 3 to 12 m. Photographs so made give an external reference system by means of which the absolute position of the shell in space can be determined. For example, the position of the center of gravity and the position of the axis can be determined as well as the distance of any breaking-off parts, such as drive mirror or drive cages in sub-caliber shells. In FIG. 1 the ray path for the picture-taking system $O_5$ after displacing the image slit $S_5$ into the position $S'_5$ is shown in dash lines and the optical axis 3' as dotted line. The image slit is displaced to such an extent that the picture-taking optical system $O_5$ forms an image of the same point of the trajectory 1 as the system $O_4$ and consequently an image $B_4$ of the shell is formed in the position $G_4$. It is in this manner that stereoscopic effect photographs are obtained.

Figure 2:
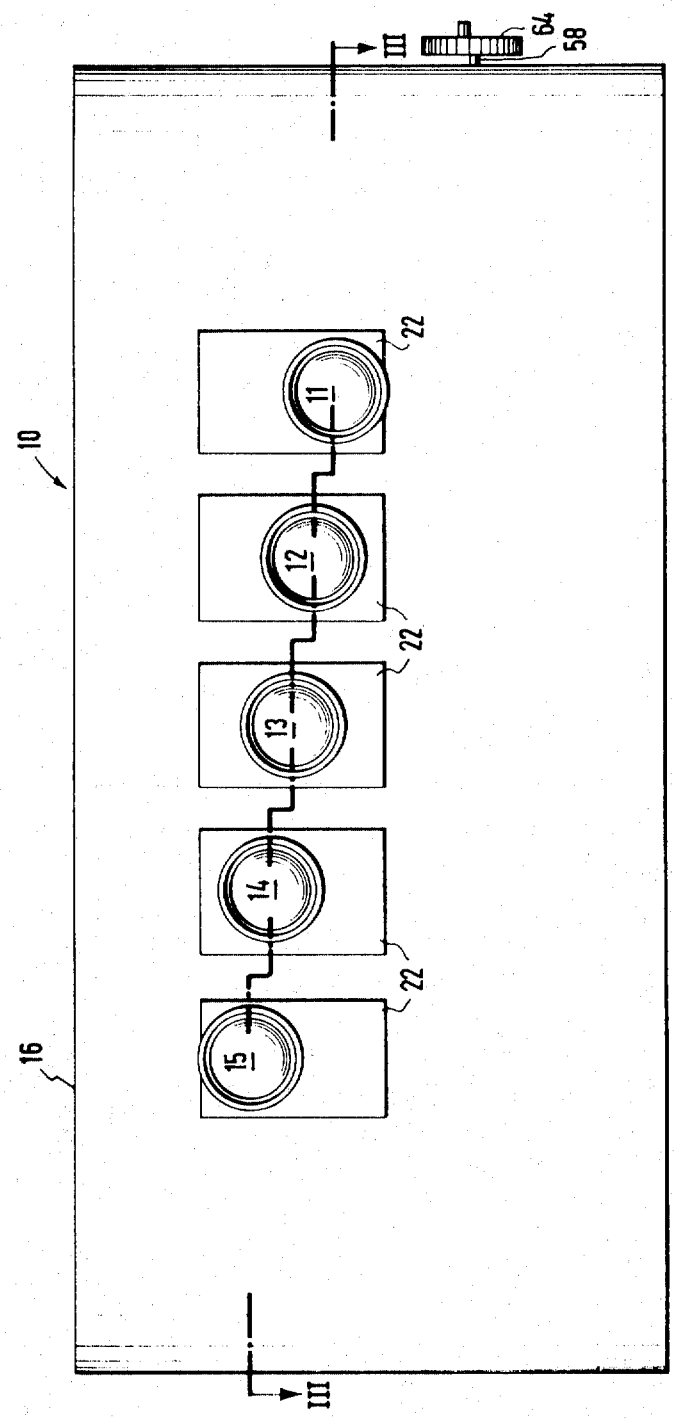
FIG. 2 is a front view of a photographing apparatus according to the invention.

FIGS. 2 to 5 show a camera denoted generally by 10 having five optical systems 11 to 15 which may be pivoted by means of a pivot mechanism. Inserted in corresponding openings in a camera casing 16 are five guide cylinders 18 which are connected fixedly together by means of holding blocks 20. Each of the optical systems 11 to 15 comprises a control head 22 which is inserted in light-tight manner in the corresponding guide cylinder 18 so that it can be pivoted about the axis of the cylinder 18 in a predetermined range by means of a pivot mechanism described hereinafter. The control heads 22 only partially fill the guide cylinders 18, leaving sufficient space for film supports 24. There is a space between the rear boundary surface of the control heads and the front side of the film support, through which the film is led. A drive motor 26 drives via a gear train (not shown) a film take-up reel 28 which runs in a damping cylinder 30 to prevent film breakages. The film 2 runs off a film feed reel 32, through the guide cylinders 18 and past the optical systems 11 to 15. The four rollers 34 ensure that film 2 bears against the rounded slide surfaces of the film supports 24 when passing through the guide cylinders 18, and each of the guide cylinders 18 comprises two opposite passages 38 through which the film 2 runs. As shown in FIG. 2, the optical systems 11 to 15 are arranged at various levels in the control heads 22 so that a staggered arrangement of the optical systems is produced. Arranged centrically with respect to the image field of the optical systems 11 to 15 are image slits 40. The latter are interchangeable and for this purpose may be withdrawn upwardly in a dovetail guide 42.

Figure 4:
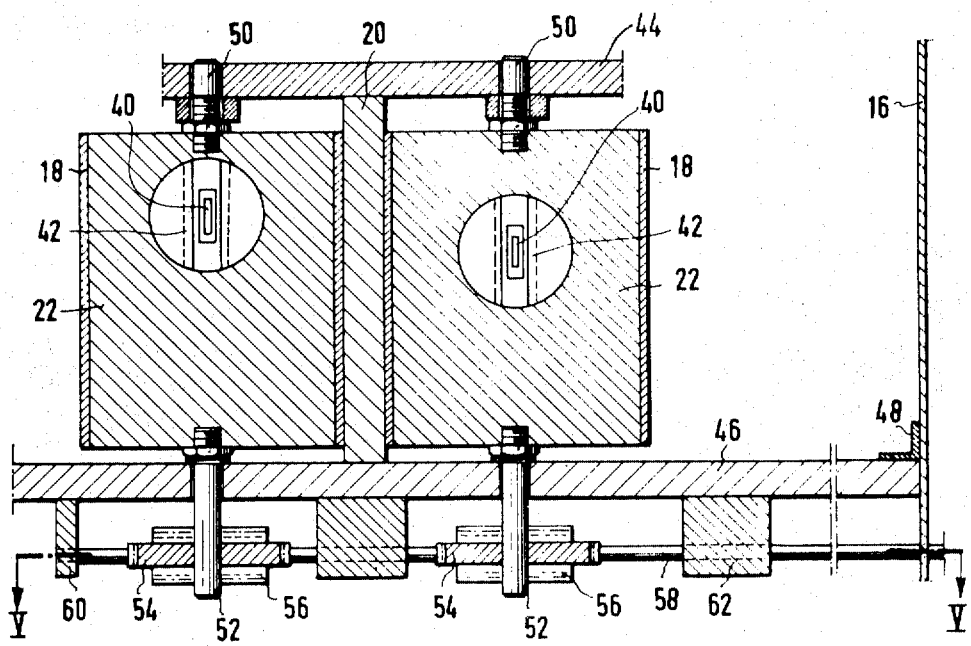
FIG. 4 is a partial section along the line IV—IV of FIG. 3 to an increased scale.
Figure 5:
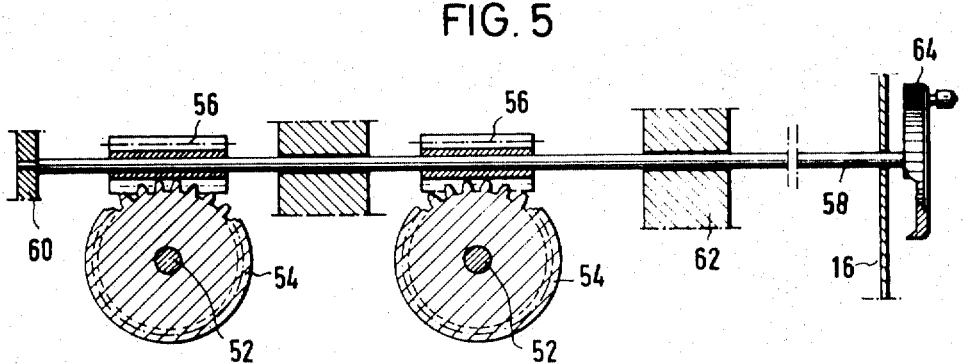
FIG. 5 is a section along the line V—V of FIG. 4.

Secured to the camera casing 16 by means of angle irons 48 are two holding plates 44, 46 (FIGS. 4 and 5).

Mounted in these holding plates 44, 46 are shafts 50, 52 which are rigidly connected to the control heads 22. The ends of the shafts 52 projecting from the lower holding plate 46 carry worm wheels 54 which engage in worms 56 arranged on an adjusting shaft 58. The adjusting shaft 58 is mounted in the camera casing 16 and in holding blocks 60, 62. It can be rotated by means of a handwheel 64 and transmits the rotational movement via the worm gears 54, 56 to the control heads 22. Only the optical systems 11, 12, 14, 15 are pivotal, the center optical system 13 being stationary. By rotating the handwheel the four outer optical systems 11, 12, 14, 15 are simultaneously pivoted. The worm wheels 56 of the optical systems 11 and 15 have a pitch opposite to the pitch of the worm wheels 56 of the optical systems 14 and 12, with the pitches being so chosen that the optical systems are directed to equidistance intervals of the shell trajectory 1 at any stage of the adjustment. According to the direction of rotation of the handwheel 64, the optical systems are pivoted towards each other or away from each other so that their optical axes 71, 72, 73, 74 and 75 converge or diverge. The optical axes 71, 72, 74 and 75 are, however, in all positions mirror-symmetrical with respect to the optical axis 73 of the center optical system 13.

Figure 3:
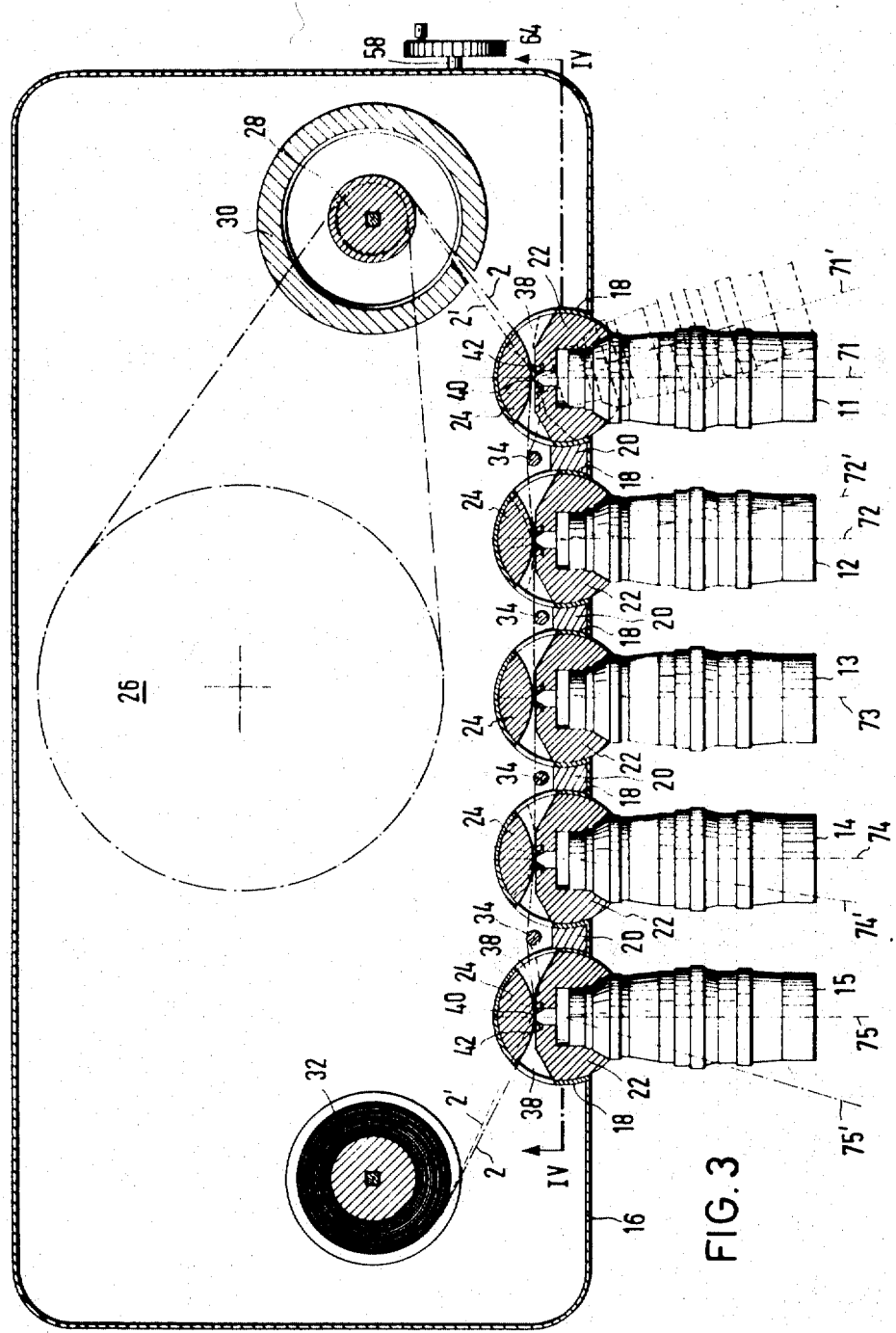
FIG. 3 is a section through the photographing apparatus according to FIG. 2 along the line III—III.

In FIG. 3 the optical systems are shown parallel. The optical system 11 is further shown in a pivoted position in dashed line and the optical axis 71 of the system 11 has thus been pivoted into the position 71'. The optical axes 72, 74 and 75 have been correspondingly pivoted into the positions 72', 74' and 75' respectively. Only the optical axis 73 of the center optical system 13 remains unchanged. As can be seen from FIG. 3, the film supports 24 are pivoted together with the optical system. The path of the film in the pivoted positions 71' and 75' of the optical systems 11 and 15 is shown at 2' in dashed line.

In the present example a camera having five picture-taking optical systems has been described. However, according to the invention cameras having less or more optical systems may also be used. The minimum number of optical systems of a camera is 2. The optical systems may also be pivoted asymmetrically with respect to each other. It is also possible to combine several optical systems in groups which are symmetrically pivoted. Furthermore, cameras may also be constructed in which a displacement of the optical systems with respect to each other is possible in addition to pivoting thereof. It is of course possible to arrange several cameras along the trajectory and at different sides or all around the trajectory each having several picture-taking optical systems.

In the drawings and specification, there has been set forth a preferred embodiment of the invention, and although specific terms are employed, they are used in a generic and descriptive sense only and not for purposes of limitation, the scope of the invention being defined in the claims.

What is claimed is:

1. A method of photographing a projectile moving along a predetermined trajectory at a predetermined velocity wherein images of the projectile are formed at focal planes of at least three picture taking optical systems having predetermined optical image ratios, the method comprising the steps of
aiming each of the at least three optical systems at a common one point along the projectile trajectory,
projecting at least thre images of the projectile from said one point along the projectile trajectory through corresponding ones of the optical systems to corresponding ones of at least three parallel focal plane tracks, and
moving a photosensitive film through the focal planes of the at least three optical systems in a direction opposite to the direction of projectile movement and at a predetermined velocity chosen to be such that the ratio of the projectile velocity to the film velocity substantially corresponds to the optical system image ratios while exposing the film to the at least three images projected to the at least three parallel focal plane tracks and thereby obtaining stereoscopic photographs of the projectile.

2. A method of photographing a projectile moving along a predetermined trajectory at a predetermined velocity wherein images of the projectile are formed at focal planes of at least three picture taking optical systems having predetermined optical image ratios, the method comprising the steps of
aiming each of the at least three optical systems at a corresponding one of at least three points spaced at predetermined distances along the projectile trajectory while pivoting the optical systems with the optical axes thereof converging toward a central axis and thereby determining a frequency of recurrence of projectile images formed at the focal planes thereof while adjusting the frequency of image recurrence through variance in the angles of convergence of the optical axes,
projecting with the determined image recurrence frequency at least three images of the projectile from corresponding points along the projectile trajectory through corresponding ones of the optical systems to corresponding ones of at least three parallel focal plane tracks, and
moving a photosensitive film through the focal planes of the at least three optical systems in a direction opposite to the direction of projectile movement and at a predetermined velocity chosen to be such that the ratio of the projectile velocity to the film velocity substantially corresponds to the optical system image ratios while exposing the film to the at least three images projected to the at least three parallel focal plane tracks.

3. Apparatus for photographing a projectile moving along a predetermined trajectory at a predetermined velocity and comprising:
at least three optical systems having focal planes and for projecting a corresponding number of images of the projectile to a corresponding number of parallel focal plane tracks,
means for mounting said at least three optical systems in predetermined spaced relation one to another and to the projectile trajectory and for pivotal movement of the optical axes of said optical systems, said optical system mounting means establishing a predetermined image ratio for said optical systems and comprising a common drive arrangement for controllably varying the aiming of the optical axes of said optical systems by pivoting them relative to a central axis so as to permit aiming of each of said at least three optical systems at a corresponding one of at least three points spaced at predetermined distances along the projectile trajectory, said common drive arrangement including a control shaft and a plurality of gear trains operatively connecting said shaft to those ones of said optical systems which are to be pivoted with the ratios of said gear trains so chosen that the optical axes of said pivoted ones of said optical systems move mirror-symmetrically to said central axis and the distances between the points from which images of the projectile are projected are uniformly varied,
said optical systems and said optical system mounting means cooperating in determining from the projectile velocity the frequency of recurrence of projectile images at said focal planes, and
means for advancing a photosensitive film in said focal planes of said optical systems in a direction opposite to the direction of movement of the projectile and at a predetermined velocity chosen to be such that the ratio of the projectile velocity to the film velocity substantially corresponds to the optical system image ratios and for exposing the film to the images of the projectile projected at said parallel focal plane tracks.

4. Apparatus according to claim 3 wherein said film advancing means comprises a plurality of film supports corresponding in number to the number of said optical systems, each of said film supports being mounted for movement with the associated one of said optical systems on variation of the aiming of the optical axis thereof.

5. Apparatus according to claim 3 wherein each of said optical systems comprises a corresponding image slit means displacable perpendicular to the optical axis of the corresponding one of said optical systems and in the direction of movement of the film.

References Cited
UNITED STATES PATENTS

| | | | |
|---|---|---|---|
| 212,865 | 3/1879 | Muybridge | 95—36 X |
| 2,433,534 | 12/1947 | Sonne | 95—18 |
| 2,583,030 | 1/1952 | Waller | 95—18 |
| 2,929,305 | 3/1960 | Blackstone | 95—12.5 |
| 2,992,591 | 7/1961 | Courtney-Pratt | 352—84 |
| 3,016,812 | 1/1962 | Chatlain | 95—11 |
| 3,019,073 | 1/1962 | Hall | 346—38 |

JOHN M. HORAN, Primary Examiner

U.S. Cl. X.R.

95—36